INVENTOR.
GEORGE L. BEERS

BY

Attorney

INVENTOR.
GEORGE L. BEERS
BY
W. H. Sprague
Attorney

3,258,526
COLOR TELEVISION RECEIVER

George L. Beers, Haddonfield, N.J., assignor to Radio Corporation of America, a corporation of Delaware Filed Feb. 12, 1962, Ser. No. 172,483
4 Claims. (Cl. 178—5.4)

Figure 1:
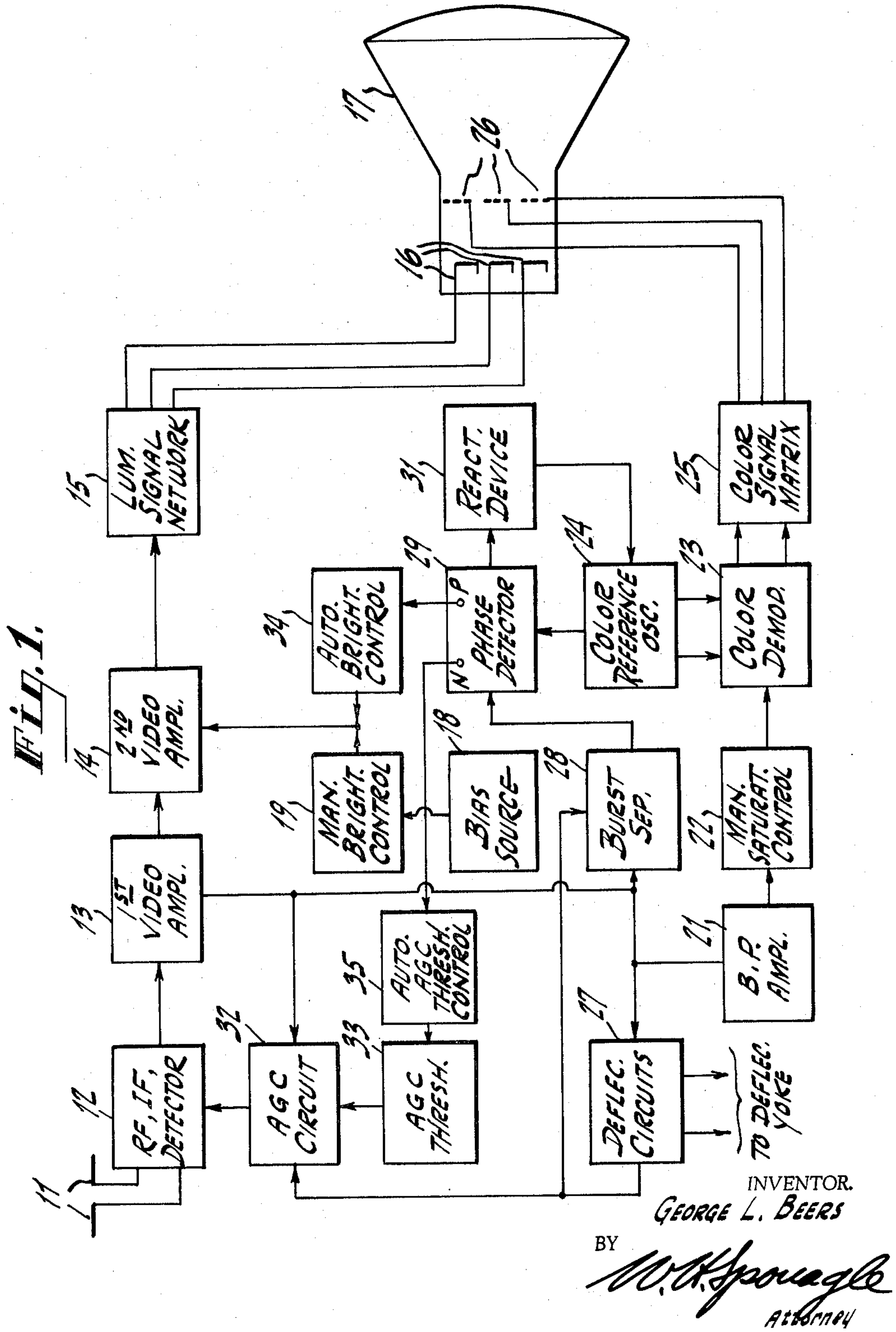

This invention relates to color television image reproducing apparatus and particularly to apparatus for automatically controlling the subjective color quality of the reproduced images.

The color television system presently standardized in the United States employs a composite video signal including a luminance component and a chrominance component. The luminance component is of the same general type as used in black and white television systems and has a frequency band from a relatively low frequency to about 4 mc. per second. The chrominance component is a sub-carrier wave which is modulated in phase to represent hue and in amplitude to represent color intensity. The chrominance component occupies a smaller frequency band than the luminance component and this smaller band is located at the high frequency end of the luminance component frequency band.

The difference in frequencies between the luminance and chrominance components may, at a given receiving location, result in the relative amplitudes of the two components being changed when the composite signal is transmitted over the air because frequency selective attenuations may exist in the transmission paths. Such a change in relative amplitudes of the luminance and chrominance components may result in the reproduction of a color image with color and contrast values which are not optimum.

It, therefore, is an object of the present invention to control automatically the brightness of the reproduced image as the chrominance component of the received signal varies with frequency selective transmission vagaries and with similar variations between television stations so as to maintain good subjective color quality of the reproduced image.

As transmitted, the composite color television signal has, in addition to the luminance and chrominance components previously mentioned, horizontal deflection synchronizing pulses and color synchronizing bursts of the color subcarrier wave. The horizontal synchronizing pulses and the subcarrier bursts are transmitted with certain specified amplitudes relative to one another. The horizontal synchronizing pulses have a repetition rate of approximately 15,750 cycles per second and the color bursts have the color subcarrier wave frequency of approximately 3.58 mc. per second. Thus, the relative amplitudes of the horizontal synchronizing pulses and the color synchronizing bursts in the received signal indicate the nature and extent of any frequency selective effects in the transmission path upon the chrominance component. They likewise indicate any variation in the chrominance component which may occur between television stations.

The present invention in effect senses any deviation from the transmitted amplitude relationship of the horizontal synchronizing pulses and the color synchronizing bursts and produces a control signal representative of the sense and magnitude of any such deviation.

In accordance with one feature of the present invention this control signal is employed to alter the brightness of the reproduced image. It has been determined that the subjective color quality of the reproduced image may be maintained by operating a television receiver over a substantial range of chrominance component variations comparable to that which may be expected in the majority of locations in which color television receivers will be used. In a reproduced color image the color values, to a substantial degree, provide contrast between objects. If the color values decrease as a result of transmission vagaries, the subjective quality of the picture can be restored, to a substantial degree, by decreasing the average brightness of the reproduced image. The reduction in average brightness increases the contrast in the reproduced image and also effectively increases the color values in the picture.

If a greater range of control is desired than can be achieved by varying the average brightness of the reproduced image, both the luminance and chrominance components may be increased in amplitude in the same proportions by means of another feature of this invention. One embodiment of this feature comprises the alteration of the threshold at which the automatic gain control apparatus of the receiver begins to function. If the reproduced image has lower than normal color values, the threshold of the automatic gain control apparatus is in effect raised so that the level of both the luminance and chrominance components is increased.

Either one of the two features of the present invention improves the subjective quality of the reproduced color image and the use of both features together has the effect of extending the range over which the present invention functions to improve the reproduced picture quality.

Figures 2, 3:
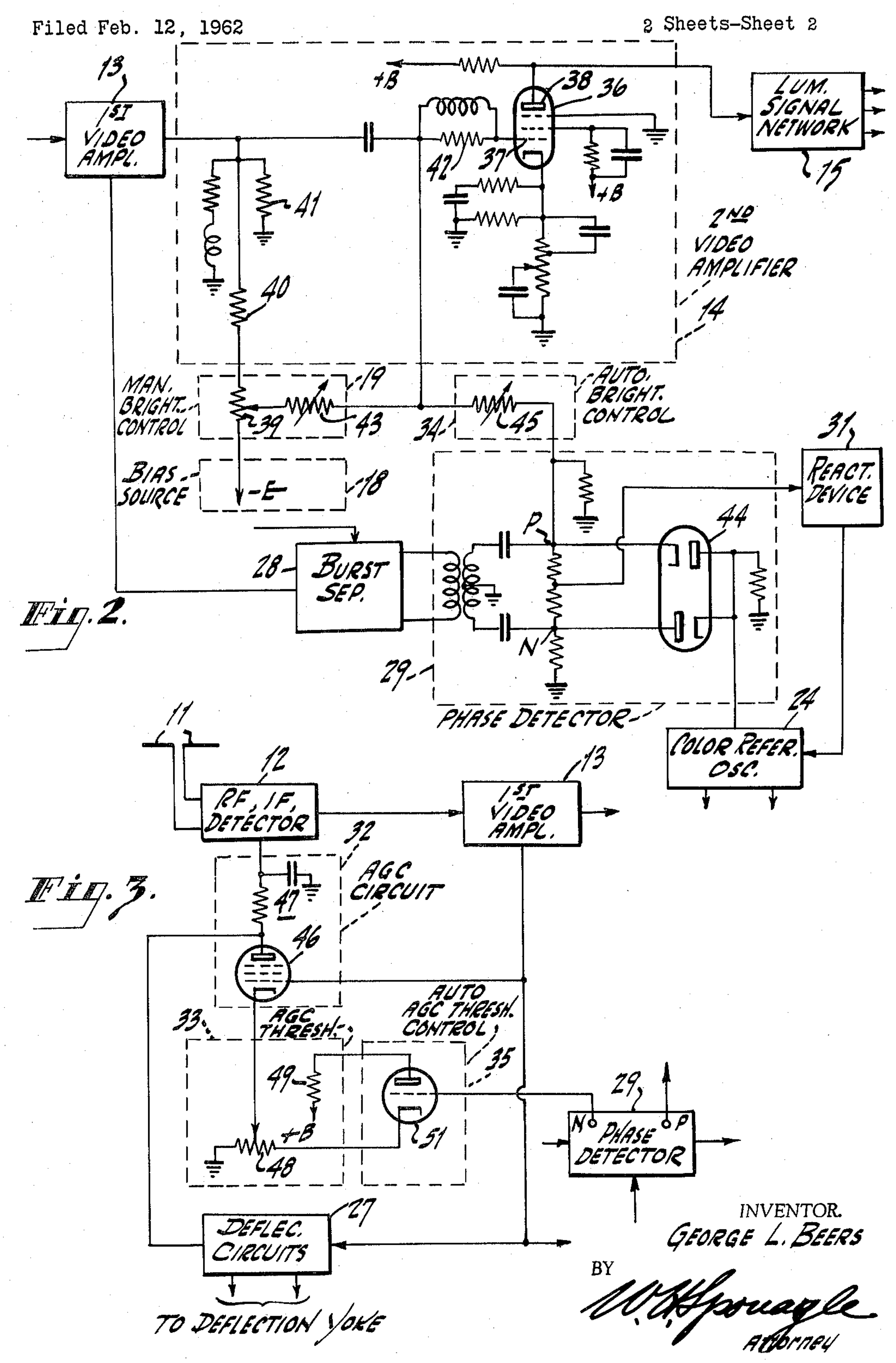

For a better understanding of the invention reference may be had to the following description given in connection with the accompanying drawings of which:

FIGURE 1 is a block diagram of a color television receiver which may be employed to reproduce a color image and which embodies the present invention;

FIGURE 2 is a schematic circuit diagram of a part of the color television receiver of FIGURE 1 illustrating in detail that feature of the invention whereby the overall image brightness of the picture is varied to improve the color subjective quality of the picture; and FIGURE 3 is a schematic circuit diagram of another part of the color television receiver of FIGURE 1 illustrating in detail that feature of the invention whereby the threshold of the automatic gain control apparatus is varied to improve the subjective color quality of the reproduced image.

Reference first is made to FIGURE 1. The composite color television signal received by an antenna 11 is processed in the RF, IF and detector circuits 12 to produce a composite video signal comprising luminance and chrominance components, deflection synchronizing pulses and color synchronizing bursts. The composite viedo signal is amplified in a first video amplifier 13. At least the luminance component is further amplified by a second video amplifier 14 and impressed upon a luminance network 15 in which it is suitably processed in a conventional manner to produce three separate luminance components which may have different amplitudes. These luminance signals are impressed respectively upon the cathodes 16 of the red, green and blue electron guns of a tricolor kinescope 17. Such a kinescope may be a shadow mask kinescope such as the 21CYP22A, the 21FBP22 or the 21FJP22, all of which are presently used in color television receivers.

The chrominance component of the composite video signal is separated by a bandpass amplifier 21 coupled to the output of the first video amplifier 13 as is customary. The amplifier 21 responds substantially only to that portion of the composite signal including the color subcarrier and its modulation sidebands. The output of the bandpass amplifier is coupled through a manual saturation control 22 to a color demodulator 23 which also receives suitable phases of a demodulating color reference wave from a color reference oscillator 24. The color representative signals derived from the color demodulator 23 are suitably combined in a color signal matrix 25 to produce red, green and blue color difference signals which are impressed upon the control grids 26 of the color kinescope 17. By means of the luminance signals impressed upon the cathodes and the color difference signals impressed upon the control grids of the three electron guns of the color kinescope the electron beams are modulated suitably to represent the red, green and blue color components of the image to be reproduced.

The deflection synchronizing pulses of the received composite signal are employed to control deflection of the electron beams of the color kinescope 17 in a conventional manner. This is accomplished by coupling the deflection circuits 27 to the output of the first video amplifier 13 for the derivation of the synchronizing pulses. The deflection circuits utilize these pulses in a conventional manner to energize the deflection yoke (not shown) provided for the color kinescope.

The output of the first video amplifier 13 also is coupled to a burst separator 28 which functions under the control of keying pulses derived from the deflection circuits 27 to separate the color synchronizing bursts from the composite signal. These bursts are impressed upon a phase detector 29 together with the color reference wave derived from the color reference oscillator 24. Any deviation in phase of the color reference wave from the bursts is detected and used to bring the reference wave oscillations into phase by means of a reactance device 31 coupled between the phase detector 29 and the frequency and phase controlling circuits of the color reference oscillator 24.

The output of the first video amplifier 13 also is coupled to an AGC circuit 32 which is of the keyed variety. It is keyed into operation by means of keying pulses derived from the deflection circuits 27 to, in effect, sense the amplitude of the received horizontal synchronizing pulses. The AGC circuit 32 functions to produce a negative unidirectional voltage which varies in accordance with any variations in the amplitude of the horizontal synchronizing pulses and is impressed upon the gain controlling circuits of the RF and IF amplifiers so as to maintain the composite signal derived from the detector substantially constant in strength. There also is provided an AGC threshold control 33. This is customarily a manual control by which the bias on the AGC circuit 32 is set so that the AGC circuit does not begin functioning to reduce the gain of the RF and IF amplifiers until the received signal has exceeded a predetermined magnitude.

The components of the color television receiver represented in FIGURE 1 described up to this point are those usually found in a color television receiver such as that described in Color Television Service Data, 1960, No. T5, published by RCA Service Company, a division of Radio Corporation of America, Camden 8, N.J. Also these components function in their customary manner.

In accordance with one of the features of the present invention such a receiver as represented in FIGURE 1 includes an automatic brightness control 34. This device is coupled to the phase detector 29 to receive a control signal of positive polarity from terminal P of the phase detector. It also is coupled to the biasing circuit of the second video amplifier 14 to function in conjunction with the manual brightness control 19 in a manner to be described subsequently, to automatically alter the overall brightness of the image reproduced by the color kinescope 17 in response to detected deviations in relative amplitude between the horizontal synchronizing pulses and the color synchronizing bursts.

In accordance with another feature of the present invention there is provided an automatic AGC threshold control 35 coupled between terminal N of the phase detector 29 and the AGC threshold control 33. The automatic AGC threshold control functions in response to detected deviations in relative amplitude between the horizontal synchronizing pulses and the color synchronizing bursts to alter the AGC threshold in a manner to be described subsequently whereby to improve the subjective color quality of the image reproduced by the color kinescope 17.

For a more detailed description of the circuits and their operation for automatically controlling the overall brightness of the reproduced image in response to variations from normal of the chrominance components reference now is made to FIGURE 2. The same reference characters are used to represent corresponding circuit components in FIGURES 1 and 2. The second video amplifier 14 includes an electron tube 36 upon the control grid 37 of which the luminance component of the composite video signal is impressed from the output of the first video amplifier 13. The amplified luminance component is derived from the anode 38 of the tube 36 and is impressed upon the luminance signal network 15. The manual brightness control 19 comprises a potentiometer 39 which is part of a voltage divider which also includes other components such as resistors 40 and 41. The biasing voltage for the video amplifier tube 36 is derived from the movable contact of the potentiometer 39 and is applied to the control grid 37 through a circuit which includes a series resistor 42. This circuit may also include a variable series resistor 43 for a purpose to be described subsequently. A negative voltage derived from the bias source 18 is impressed across the voltage divider including the brightness control potentiometer 39.

In order to increase the overall brightness of the image reproduced by the color kinescope 17 of FIGURE 1 the D.C. potential impressed upon the cathodes 16 is altered in a negative-going sense. This is accomplished by increasing the D.C. current in the second video amplifier tube 36 as a result of an adjustment of the manual brightness control potentiometer 39 in an manner to decrease the negative biasing voltage impressed upon the control grid 37. In order to decrease the overall brightness of the reproduced image the manual brightness control potentiometer 39 is adjusted so as to increase the negative biasing of the control grid 37 of the video amplifier tube 36.

In a television receiver, such as that covered by the service data previously referred to, the phase detector 29 includes a double diode electron tube 44 connected to the color reference oscillator 24 and to the burst separator 28 as shown in FIGURE 2. Each of the diodes operating in the phase detector circuit serves, in effect, as an envelope detector of the color synchronizing bursts. There is thus developed at the positive and negative terminals P and N respectively positive and negative unidirectional voltages having amplitudes corresponding to the amplitude of the received bursts. The positive terminal P of the phase detector 29 is coupled through a resistor 45 (which may be variable as shown) comprising the automatic brightness control 34 to the control grid 37 of the second video amplifier tube 36. The combination of this voltage and the voltage derived from the manual brightness control potentiometer 39 controls the biasing of the control grid 37 and thereby the D.C. current through the tube 36. The resistor 43 (when provided) is used in combination with resistor 45 as a voltage divider so that any desired relationship between the voltage derived from potentiometer 39 and the voltage from phase detector 29 can be obtained to apply to the control grid 37.

For an explanation of the manner in which the automatic brightness control in accordance with this feature of the invention operates to improve the subjective color quality of the reproduced image, assume that the chrominance component of the received composite television signal becomes attenuated in transmission to a greater degree than the horizontal synchronizing pulses. The AGC circuit 32, operating conventionally in response to the horizontal synchronizing pulses and without benefit of the second feature of this invention (to be described more fully subsequently), will control the gain of the signal implifiers so as to maintain these synchronizing pulses and the chrominance component of the received composite signal at substantially the same ratio as received. Because of the assumed selective attenuation of the chrominance component, however, this component after demodulation and matrixing will be applied to the kinescope in reduced amplitude because the AGC circuit will not change the received amplitude relationship of the horizontal synchronizing pulses and chrominance component. In the absence of the present invention, the image would be reproduced with lower than normal color values and reduced contrast.

Under the foregoing conditions the color synchronizing bursts will also be attenuated in transmission and will be applied to the phase detector 29 in reduced amplitude because the AGC circuit will not change the received amplitude relationship of the horizontal synchronizing pulses and the bursts. Hence, the unidirectional voltage developed at terminal P of the phase detector 29 will have a smaller positive implitude. The combined action of the AGC circuit and the phase detector produces a signal representative of the relative amplitudes of the synchronizing pulses and the bursts. Thus, when the voltage developed at the phase detector terminal P is combined with the voltage derived from the manual brightness control potentiometer 39, the resultant bias on the control grid 37 is more negative, thereby decreasing the D.C. current in the tube 36. The D.C. potential at the anode 38, therefore, is more positive so that, when impressed upon the cathodes 16 of the color kinescope 17, the average electron beam current from the rid, green and blue electron guns is decreased, resulting in a decrease in the overall brightness of the reproduced image. This has the desired effect of subjectively improving the color quality of the reproduced image. It is evident that, should the horizontal synchronizing pulses become more attenuated in transmission than the chrominance component, the operation of the automatic brightness control will have the opposite effect of increasing the overall image brightness so as to effectively reestablish the proper color values in the reproduced image.

FIGURE 3 to which reference now is made shows the feature of the present invention comprising the supplemental control of the threshold of the automatic gain control apparatus by which to enhance the subjective color quality of the reproduced image. The AGC circuit 32 includes an electron tube 46 which receives the composite television signal from the first video amplifier 13. It is pulsed or keyed for response to the horizontal synchronizing pulses by means of flyback pulses derived from the deflection circuits 27. A filter network 47 provides the usual AGC voltage which is applied to the RF and IF amplifiers in a conventional manner. The AGC threshold control 33 is in the form of a potentiometer 48 which may be adjusted to apply a suitable potential to the cathode of the AGC tube 46 so as to suitably establish the threshold at which the AGC circuit begins to function. Normally the threshold potentiometer 48 is supplied with an operating voltage from a source through a resistor 49. The AGC apparatus described up to this point is conventional and is of the same character as that shown in the Color Television Service Data, 1960, No. T5 previously referred to.

In accordance with this feature of the present invention there also is provided the automatic AGC threshold control 35 comprising an electron tube 51 through which the operating potential for the threshold potentiometer 48 is supplied. The control grid of the tube 51 is connected to the negative terminal N of the phase detector 29 so that the conductivity of the tube is subject to variation in response to any detected variation in the amplitude of the received color synchronizing bursts.

In describing the operation of the automatic AGC threshold control 35, consider first the operation of the AGC circuit 32 in conjunction with the threshold potentiometer 48 in a conventional color television receiver without the benefit of this feature of the present invention. The threshold potentiometer 48 is adjusted to provide a desired signal level at the detector in apparatus 12 of FIGURE 1. The AGC will then control the gain in the RF and IF amplifiers to maintain this signal level. By adjusting the potentiometer 48 the signal level at the detector can be varied as desired. The AGC tube 46 is so biased by the potential applied to its cathode from the threshold potentiometer 48 that it is not rendered conducting until the horizontal synchronizing pulses have reached the desired threshold level. For received signals greater than the threshold level of the tube 46 is rendered pulses impressed upon its control grid and the flyback pulses impressed upon its anode. In this case a negative AGC voltage is developed and impressed upon the RF and IF amplifiers to suitably decrease their gains whereby the signal level at the detector is maintained substantially constant.

With the automatic AGC threshold control 35 employed in accordance with the present invention and with the horizontal synchronizing pulses and chrominance components of the received signal having their normal amplitude relationship to one another, the threshold control tube 51 has such normal conductivity that the automatic gain control of the RF and IF amplifiers is substantially as described with reference to a receiver not having this feature of the present invention. Should the chrominance component of the received signal be more attenuated than the horizontal synchronizing pulses, the negative voltage developed at terminal N of the phase detector 29 also will be decreased so that the control tube 51 draws more current. As a consequence, the current through the potentiometer 48 increases and the positive potential of the cathode of the AGC tube 46 increases. As a result, the AGC threshold is raised which has the effect of increasing the signal level at the detector. Increasing the signal level at the detector correspondingly increases the signal potentials applied to the color kinescope. Increasing the signal potentials applied to the kinescope substantially reestablishes normal color values and contrast in the reproduced color picture when the chrominance components are selectively attenuated with respect to the horiozntal synchronizing components. In the event that the horizontal synchronizing pulses are received with more attenuation than the chrominance component, the reverse action takes place, resulting in a lowering of the AGC threshold and a consequent reestablishment of normal color values and contrast in the reproduced picture.

It is not necessary in every case to have all of the current which traverses the threshold potentiometer 48 to also flow through the automatic AGC threshold control tube 51 as shown in FIGURE 3. The potentiometer 48 may be directly connected through the resistor 49 to a source of positive voltage and the tube 59 may be so connected that its cathode current flows through the potentiometer 48. Such an arrangement will enable the operation of the tube 51 so that, when the automatic control feature provided thereby is not needed, the tube may be completely cut off.

This second feature of the present invention need not be restricted to the control of the AGC threshold as shown in, and described with reference to, FIGURE 3. Instead the operating threshold of a video amplifier connected in the circuit of FIGURE 1 at any point ahead of that at which the chrominance signal is derived may be controlled in a manner similar to that disclosed in FIGURE 3 with reference to the AGC tube 46.

It also should be noted that the average brightness of the reproduced color image need not be controlled in response to detected burst amplitude in the precise manner shown in, and described with reference to, FIGURE 2. Instead, the automatic brightness control may be achieved at the color kinescope 17 itself in the same general manner as that employed in the brightness control arrangements for black and white kinescopes.

What is claimed is:

1. In a color television receiver including an image reproducing device and adapted to receive a composite signal including a luminance video signal component, a chrominance video signal component in the form of a phase and amplitude modulated subcarrier wave of a given frequency, deflection synchronizing pulses and color synchronizing bursts comprising several cycles of said subcarrier wave frequency and having a predetermined amplitude relationship to the amplitude of said deflection synchronizing pulses, the combination comprising: signal control means having an operative threshold and responsive to the amplitude of said received synchronizing pulses to maintain a substantially constant level of said received composite signal; means operative to produce a control signal representative of the relative amplitudes of said received synchronizing pulses and bursts; and means responsive to said control signal to automatically vary the operative threshold of said signal control means.

2. In a color television receiver including an image reproducing device and adapted to receive a composite signal including a luminance video signal component, a chrominance video signal component in the form of a phase and amplitude modulated subcarrier wave of a given frequency, deflection synchronizing pulses and color synchronizing bursts comprising several cycles of said subcarrier wave frequency and having a predetermined amplitude relationship to the amplitude of said deflection synchronizing pulses, the combination comprising: means to control the overall brightness of the image produced by said image reproducing device; signal control means having an operative threshold and responsive to the amplitude of said received synchronizing pulses to maintain a substantially constant level of said received composite signal; means to manually adjust the overall brightness of said reproduced image; means to manually adjust the operative threshold of said signal control means; means to produce a control signal representative of the amplitude of said received bursts; and means responsive to said control signal to automatically vary the overall brightness of said reproduced image and the operative threshold of said signal control means.

3. In a color television receiver including an image reproducing device and adapted to receive a composite signal including a luminance video signal component, a chrominance video signal component in the form of a phase and amplitude modulated subcarrier wave of a given frequency, a deflection synchronizing pulses and color synchronizing bursts comprising several cycles of said subcarrier wave frequency and having a predetermined amplitude relationship to the amplitude of said deflection synchronizing pulses, the combination comprising: signal control means having an operative threshold and responsive to the amplitude of said received synchronizing pulses to maintain a substantially constant level of said received composite signal; means to produce a control signal representative of the amplitude of said received bursts; and means responsive to said control signal to vary the operative threshold of said signal control means.

4. In a color television receiver including an image reproducing device and adapted to receive a composite signal including a luminance video signal component, a chrominance video signal component in the form of a phase and amplitude modulated subcarrier wave of a given frequency, deflection synchronizing pulses of fixed transmitted amplitude and color synchronizing bursts comprising several cycles of said subcarrier wave frequency and of fixed transmitted amplitude having a given relation to the transmitted amplitude of said deflection synchronizing pulses, the combination comprising: signal control means having an operative threshold and responsive to the amplitude of said received synchronizing pulses to maintain a substantially constant level of said received composite signal; means to manually control the operative threshold of said signal control means; means to produce a control signal representative of the amplitude of said received bursts; and means responsive to said control signal to automatically vary the operative threshold of said signal control means.

References Cited by the Examiner

UNITED STATES PATENTS

| | | | |
|---|---|---|---|
| 2,843,666 | 7/1958 | Preisig | 178—5.4 |
| 2,883,452 | 4/1959 | Macovski | 178—5.4 |
| 2,921,120 | 1/1960 | Pritchard et al. | 178—5.4 |
| 2,965,705 | 12/1960 | Luther | 178—5.4 |
| 3,037,071 | 5/1962 | Schaefer et al. | 178—5.4 |

FOREIGN PATENTS

| | | |
|---|---|---|
| 229,061 | 10/1959 | Australia. |
| 875,876 | 8/1960 | Great Britain. |

DAVID G. REDINBAUGH, *Primary Examiner.*

ROBERT SEGAL, *Examiner.*

J. A. O'BRIEN, *Assistant Examiner.*